United States Patent [19]

Langberg

[11] 4,085,617
[45] Apr. 25, 1978

[54] FAST RESPONSE THERMOMETER

[76] Inventor: Edwin Langberg, 33 Manning La., Cherry Hill, N.J. 08003

[21] Appl. No.: 673,806

[22] Filed: Apr. 5, 1976

[51] Int. Cl.² ............................................. G01K 7/38
[52] U.S. Cl. ............................................. 73/362 CP
[58] Field of Search ........................ 73/362 CP, 362 R

[56] References Cited

U.S. PATENT DOCUMENTS

| | | | |
|---|---|---|---|
| 3,014,371 | 12/1961 | McConnell | 73/362 AR |
| 3,250,126 | 5/1966 | Shapiro | 73/362 CP |
| 3,303,701 | 2/1967 | Matsuma et al. | 73/362 CP X |
| 3,614,893 | 10/1971 | Nesbitt et al. | 73/362 CP X |
| 3,848,466 | 11/1974 | Dial et al. | 73/362 CP X |
| 3,929,018 | 12/1975 | Turner | 73/343 R |

Primary Examiner—Richard C. Queisser
Assistant Examiner—John S. Appleman
Attorney, Agent, or Firm—Pennie & Edmonds

[57] ABSTRACT

This invention relates to a thermometer and more particularly to a fast response clinical thermometer. The active element is in the form of a thin sleeve which is in direct contact with the body tissue or other item to be measured. The large ratio of surface to volume of the active element permits it to reach temperature equilibrium rapidly. Temperature dependent changes in the sleeve material influence a coil which is inductively coupled to the sleeve. The coil in turn controls an oscillator frequency which can be converted to a digital display of the measured temperature.

3 Claims, 4 Drawing Figures

FAST RESPONSE THERMOMETER

BACKGROUND OF THE INVENTION

Electronic thermometry finds an extensive and steadily increasing application in many fields such as industry, science and medicine. This invention relates to an electronic thermometer which can be used for many applications, even though the specific description concentrates primarily on its clinical use in medical care.

There are a number of features which are desirable for the optimum design of a clinical thermometer. The reading should be unambiguous, the thermometer should be easily reusable from patient to patient without need for sterilization, and an accurate temperature reading should be reached quickly and reliably. The requirement for quick response (of an order of seconds) is quite important since it translates, in a hospital setting, into efficient time utilization by nurses and paramedics.

Many clinical electronic thermometers of today use a thermistor as a temperature sensor. A thermistor has many useful features, such as large temperature coefficient of resistance as well as adequate reproducibility and stability. However, when properly encased, its response time is not much better than that of a conventional thermometer. Typical equilibrium times range from 30 seconds to several minutes. Other measurement schemes have been devised utilizing variations of measurable electrical and magnetic parameters, including capacitance, inductance, or resistance variation with temperature. None have afforded a rapid response time compatible with other requirements set forth above as desirable for clinical application.

SUMMARY OF THE INVENTION

In accordance with this invention, a thermometer is provided which affords reliable and accurate temperature readout within seconds and which is compatible with electronic display and recording systems. Expressly important is the suitability of thermometers in accordance with the invention for clinical applications particularly the use of an inexpensive, disposable sensing element that is biologically safe and may be maintained in sterile form.

Quantitative representation of the response time of a thermometer is given by its time constant $\tau$. The indicated temperature T is a function of time $t$ from the moment when the thermometer, previously maintained at temperature $T_a$, is placed in contact with the patient (in the case of a clinical thermometer) whose body temperature is $T_b$. The indicated temperature is given by the equation:

$$T(t) = T_b + (T_a - T_b) \exp(t/\tau) \qquad 1$$

It can be seen from the above equation that after a time interval equal to four time constants the indicated temperature is:

$$T(t) = 0.02 T_a - 0.98 T_b \qquad 2$$

After this time interval, the final equilibrium temperature has been reached. It can be also seen that the nonequilibrium error is reduced if the initial temperature $T_a$ and the body temperature $T_b$ are close to each other.

The thermal time constant $\tau$ of the thermometer is a function of the thermal capacitance and the thermal conductivity of the active element. The thermal capacitance is proportional to the active volume of the thermometer and to the specific heat of the active material. It can be expressed by the temperature increase (in °C) caused by the energy (heat) absorbed by the active volume. Consequently, in one system of units, thermal capacity is given in °C/Watt-sec. Thermal conductance expresses the heat flow (in Watts) per degree difference between the active volume and its surroundings. Thus, thermal conductance is proportional to the active surface area and to the thermal conductivity of the active material.

More precisely, the thermal time constant is directly proportional to thermal capacitance and inversely proportional to thermal conductance. The geometrical factor of the time constant is therefor the ratio of the volume to the surface of the active area which is defined as the characteristic length. As will be explained in more detail later, the thermometer described in this invention has its active region in the form of a thin film cylindrical sleeve. Since the volume of the sleeve is $\pi dha$ and the surface is $\pi dh$, where $d$ is the diameter, $h$ is the height and $a$ is the thickness, this characteristic length is the thickness of the sleeve. In contrast, an encased thermistor thermometer is typically spherical in shape with a radius $r$ of $\frac{1}{8}$ inch. Since the volume-to-surface ratio for a sphere is $r/3$, the typical characteristic length is 42 mils. On the other hand, sleeve thickness may be only 0.5 mil. Hence, the improvement of the response time based on the characteristic length alone, represents an improvement equal to two orders of magnitude.

BRIEF DESCRIPTION OF THE DRAWINGS

The invention will be more fully described in connection with the annexed drawings, in which.

DESCRIPTION OF THE PREFERRED EMBODIMENTS OF THE INVENTION

Figure 1:
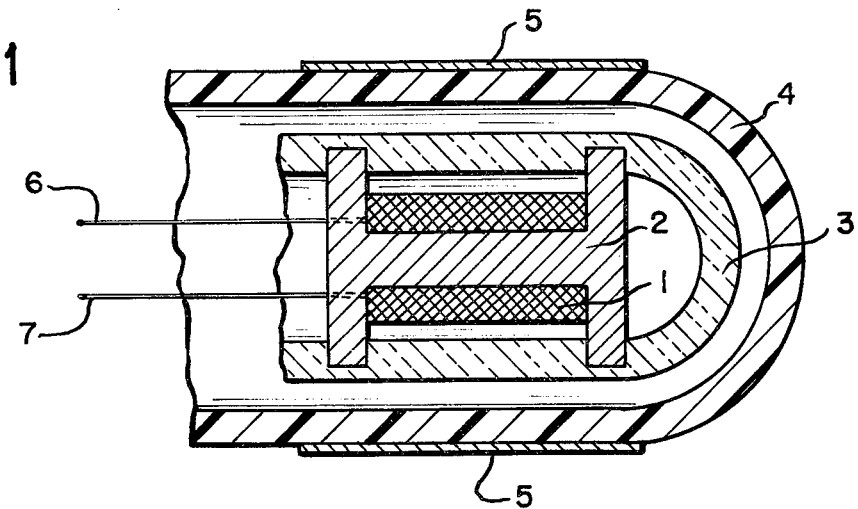
FIG. 1 shows the configuration of the tip of the measuring probe.

As shown in FIG. 1 a coil 1 is formed by winding magnet wire around a core 2. The coil is fully enclosed in a tube 3, made of insulating material. A disposable plastic sheath 4 covers tube 3. The outside of the plastic sheath has a thin sleeve 5 of active material. The active material, as will be described in more detail later, may be a metal foil or a thin film of a semiconductor, or a ferrite. The terminals of the coil are wires 6 and 7.

In operation, the coil creates a magnetic field indicated by lines 8 and 9 in FIG. 2. The magnetic field penetrates through the tube 3 and sheath 4 and interacts inductively with the active material 5.

As shown in FIG. 1, the sleeve 5 is made of a ferromagnetic alloy such as 93% nickel and 7% chromium. The sleeve 5 is in the form of a thin tube slit along its length. The inside diameter of the tube is slightly smaller than the outside diameter of the sheath 4 so that the spring action of the slit tube holds it firmly on the sheath 4.

The slit in the sleeve 5, in addition to its role in mechanical assembly described above, also has an important electrical function. It prevents the circulation of induced current along the circumference of the sleeve and therefore significantly reduces losses and improves the Q of the coil.

The inductance of the coil is given by the formula $$L = N^2/(R_1 + R_2) \qquad 3$$

where N is the number of turns, $R_1$ is the magnetic reluctance of sleeve 5, and $R_2$ is the magnetic reluctance of the remaining magnetic circuit consisting of core 2 and the gap between core 2 and sleeve 5. This gap determines primarily the value of the reluctance $R_2$ which is independent of temperature.

The material used in fabrication of the sleeve 5 is specifically chosen so that its magnetic permeability varies rapidly in the temperature region of interest. This temperature range for clinical applications is between 35° and 41° C. The desired rapid permeability variations can be accomplished by choosing the Curie temperature $T_c$ of the material to be somewhat above the upper most temperature of interest, i.e. at 45° C. The permeability $\mu$ in this range can be expressed approximately by:

$$\mu = \mu o [1 + k(T_c - T)] \qquad 4$$

where $\mu o$ is the permeability of free space, $k$ is the constant determined by the material, and T is the measured temperature.

The reluctance of the sleeve is then:

$$R_1 = h/\pi \, da \, \mu o [1 + k(T_c - T)] \qquad 5$$

where $h, d, a$ are respectively the height, the diameter and the thickness of the sleeve.

Design parameters can be chosen so that at the upper temperature limit $R_1$ is substantially lower than $R_2$, i.e. $R_1 = 3 R_2$. At the lower temperature limit $R_1$ is comparable to $R_2$, i.e. $R_1 = R_2$. Then over the clinical temperature range, the inductance varies by a factor of 2:1. This is a very reasonable factor which can be readily instrumented for excellent temperature resolution.

Figure 2A:
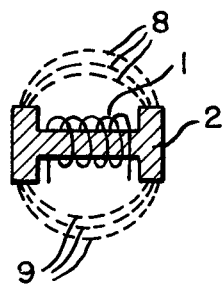
FIG. 2A shows the magnetic field created by the coil without the sleeve.
Figure 2B:
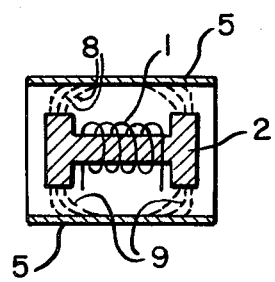
FIG. 2B shows the magnetic field created by the coil with the sleeve.

The magnetic field representing two possible temperature extremes is shown in FIGS. 2A and 2B. At or near the Curie temperature the effect of the sleeve 5 is small and the magnetic field between the ends of the core 2 would be as shown by dashed lines in FIG. 2A. On the other hand, at lower temperatures, the magnetic field, as shown by dashed lines in FIG. 2B, is concentrated in the low reluctance path through sleeve 5.

This concentration of magnetic field reflects itself back to the coil, and causes a change of the Q and inductance of the coil. The magnitude of this change depends on the geometry of the coil and the sleeve, and on the conductivity and permeability of the sleeve material. Preferred embodiments employ materials which exhibit a change in permeability, with temperature, but materials exhibiting adequate conductivity change with temperature may also be used.

The advantage of this thin sleeve configuration for a fast and accurate clinical measurement of temperature is evidenced from the analysis of thermal time constant given earlier. The heat flow between body tissue and the thin sleeve thermometer is rapid; after insertion into the mouth, for example, any temperature differential between the two is quickly equalized due to heat flow over a large area into a thin, thermally conducting sleeve. Since the plastic sheath 4 and the air gap between it and tubes 3 are thermal insulators the temperature of the sleeve 5 reaches the body temperature using very little heat input because of the small amount of material in the sleeve. Thin sleeve 5 in accordance with the invention may be formed of any material that can be manufactured in a thin foil, or film, (e.g. 0.5 mils or less); that is biologically safe; which has a high thermal conductivity; which exhibits adequate variation of magnetic permeability (or electrical conductivity) with temperature; and which has a magnetic permeability (or electrical conductivity) substantially different from that of the thermally and electrically insulating sheath 4.

Such a material should have a reproducible temperature coefficient of permeability, of about 2% per degree or higher, in the desired operating range. Preferably the material is chosen for a particular application such that its Curie temperature is a few degrees above the desired measurement range in order to maximize the rate of change of permeability with temperature.

One material which meets all of the foregoing criteria, for clinical purposes, is an alloy of about 93% nickel and 7% chromium which has a Curie temperature of approximately 43° to 45° C, is biologically safe, and has the desired thermal conductivity and magnetic permeability properties. Other alloys or nickel having a wide range of Curie temperatures are acceptable. In addition to nickel alloys, alloys of iron, rare earth metals, and ferrites can be used for the material of sleeve 5 and would be chosen to fit the physical requirements of the particular temperature measurement application.

Sheath 4 may be of a thickness adequate for necessary structural rigidity in order to retain sleeve 5, preferably about 1/16 of an inch. A sleeve may be shrink-fitted onto the sheath 4 or may be bonded thereto with a thin layer of adhesive, or a bond may be formed by softening the sheath material itself, if made of a thermoplastic material. Other appropriate methods will be apparent to those familiar with manufacturing technology for bonding thin layers of material to a compatible substrate.

Figure 3:
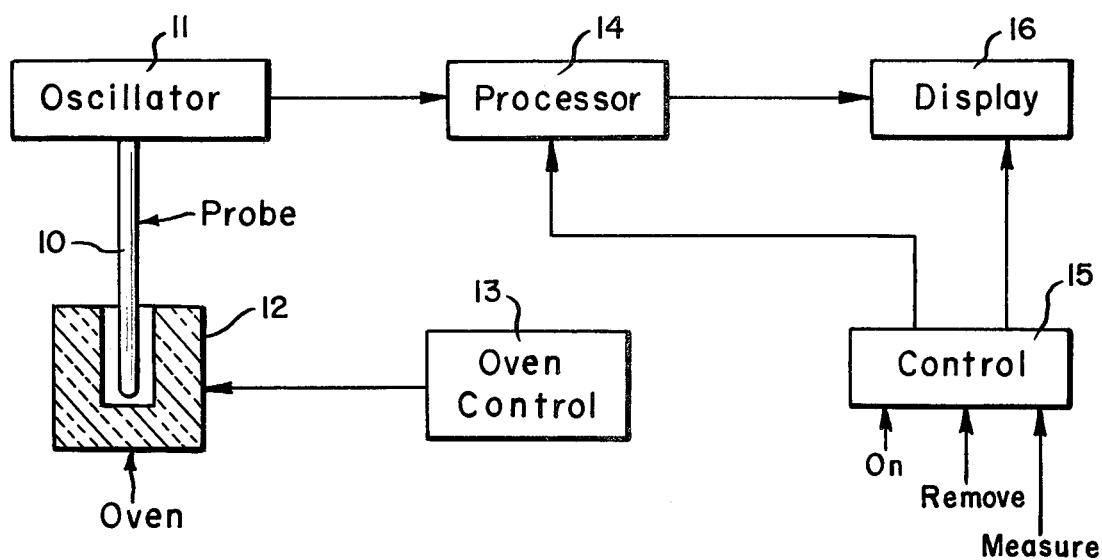
FIG. 3 shows the block diagram of the thermometer.

A circuit for converting changes in inductances, due to the measured temperature, into an electrical readout is shown in the block diagram in FIG. 3. The coil located at the tip of the probe 10 is a part of the resonant circuit of the oscillator 11, and hence changes in inductance of coil 2, such as may be created by temperature variation of the permeability of the sensing sleeve 5, result in the frequency variation of the oscillator 11. Prior to use, the measuring probe covered by the sheath may be placed in a miniature oven 12, kept at a constant controlled temperature by oven control 13. This temperature is chosen to be just below the clinical range of body temperatures. When the probe 10 is in the miniature oven 12, the frequency $f_a$ of the oscillator 11 is counted in the processor 14. When the probe is removed to perform the temperature measurement, the last $f_a$ count is stored. As the thermometer is placed in contact with the patient, frequency counts are performed at regular intervals, such as every one-half second. These readings are compared in the processor 14 with each other and only the frequency $f_b$ corresponding to the highest temperature reading is stored. The connection between the oscillator 11 and the processor 14 can be by a wire or wireless link. At the time the Measure button of control circuit 15 is pressed, the lowest frequency count $f_b$, corresponding to the highest sampled temperature is stored. The storing and processing commands are accomplished by control circuit 15. A normalizing operation is performed by the arithmetic portion of the circuit 14 which determines T based on the equation:

$$T = P(f_a - f_b)/f_a \qquad 6$$

where $P$ is an appropriate constant of proportionality which converts the frequency to temperature in degrees Fahrenheit or Centigrade. The calculated temperature is shown on display 16. The method of signal processing used has two important advantages:

1. There is no need for close tolerances in manufacture of active sleeves since the method is self-calibrating.

2. Selection of the readout corresponding to the highest temperature assures the condition of the best thermal contact with the patient's body will be used for temperature determination.

Other methods of converting the electrical output of the coil into electrically appropriate form for readout may be employed, as required for particular applications. It will be apparent to those of ordinary skill in this art that changes may be made in the above described specific preferred embodiments without departing from the scope and spirit of the invention, which is limited solely in accordance with the following claims.

I claim:

1. A thermometer probe comprising: means for generating an electromagnetic field; a housing for said means for generating an electromagnetic field; a temperature sensing material which forms a magnetic path with said electromagnetic field; said temperature sensing material disposed on a thermally and electrically insulating removable, disposable sheath fitted over said housing.

2. A thermometer probe as defined in claim 1 wherein said temperature sensing material is of a form having a short characteristic length and is a ferromagnetic metal alloy, or a ferrite.

3. A thermometer probe, as defined in claim 2, for sensing temperature over a temperature range wherein said temperature sensing material is in the form of a thin layer, disposed around substantially the entire perimeter of said sheath and has a curie temperature within a few degrees higher than the top of said temperature range.

* * * * *

UNITED STATES PATENT AND TRADEMARK OFFICE
CERTIFICATE OF CORRECTION

PATENT NO. : 4,085,617
DATED : April 25, 1978
INVENTOR(S) : Edwin Langberg

It is certified that error appears in the above-identified patent and that said Letters Patent are hereby corrected as shown below:

Column 3, line 34, "substantially lower" should read
-- substantially larger --.

Column 4, line 22, "alloys or nickel" should read
-- allovs of nickel --.

Signed and Sealed this

Seventeenth Day of October 1978

[SEAL]

Attest:

RUTH C. MASON
Attesting Officer

DONALD W. BANNER
Commissioner of Patents and Trademarks